(12) United States Patent
Woodring

(10) Patent No.: US 8,155,287 B2
(45) Date of Patent: *Apr. 10, 2012

(54) SYSTEMS AND METHODS FOR PROVIDING USER PROFILE INFORMATION IN CONJUNCTION WITH AN ENHANCED CALLER INFORMATION SYSTEM

(75) Inventor: Larry D. Woodring, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1182 days.

This patent is subject to a terminal disclaimer.

(21) Appl. No.: 11/742,665

(22) Filed: May 1, 2007

(65) Prior Publication Data

US 2007/0195942 A1    Aug. 23, 2007

Related U.S. Application Data

(63) Continuation of application No. 09/964,390, filed on Sep. 28, 2001, now Pat. No. 7,269,249.

(51) Int. Cl.
*H04M 11/00* (2006.01)
(52) U.S. Cl. ............ 379/93.17; 379/93.23; 379/142.05; 379/142.06; 379/142.1; 379/142.11
(58) Field of Classification Search ............... 379/93.17, 379/93.23, 142.05, 142.06, 142.1, 142.11, 379/245
See application file for complete search history.

(56) References Cited

U.S. PATENT DOCUMENTS

| | | |
|---|---|---|
| 4,266,098 A | 5/1981 | Novak |
| 4,268,722 A | 5/1981 | Little et al. |
| 4,277,649 A | 7/1981 | Sheinbein |
| 4,582,956 A | 4/1986 | Doughty |
| 4,649,433 A | 3/1987 | Verhoeven |
| 4,649,533 A | 3/1987 | Chorley et al. |
| 4,663,777 A | 5/1987 | Szeto |
| 4,674,115 A | 6/1987 | Kaleita et al. |
| 4,698,839 A | 10/1987 | DeVaney et al. |
| 4,791,664 A | 12/1988 | Lutz et al. |
| 4,797,911 A | 1/1989 | Szlam et al. |
| 4,802,202 A | 1/1989 | Takahashi et al. |
| 4,817,133 A | 3/1989 | Takahashi et al. |
| 4,823,304 A | 4/1989 | Frantz et al. |
| 4,845,743 A | 7/1989 | Lutz |
| 4,850,013 A | 7/1989 | Rose |

(Continued)

FOREIGN PATENT DOCUMENTS

EP    0821511    1/1998

(Continued)

OTHER PUBLICATIONS

DERWENT-ACC-No. 2001-327813 Latter et al. Feb. 19, 1999.*

(Continued)

*Primary Examiner* — Quynh Nguyen
(74) *Attorney, Agent, or Firm* — Cantor Colburn LLP

(57) ABSTRACT

An enhanced caller-id service providing multi-media based caller information to subscribers via a server system. The server system can combine user-provided profile information with other data to provide more detailed reports for the subscriber. The server can also be used to maintain long-term calling records for subscribers. The caller information can be accessed remotely by the subscriber and can be downloaded from the server to another computer for use with other applications.

17 Claims, 4 Drawing Sheets

U.S. PATENT DOCUMENTS

| | | |
|---|---|---|
| 4,850,103 A | 7/1989 | Takemoto et al. |
| 4,995,075 A | 2/1991 | Angiolillo-Bent et al. |
| 5,029,196 A | 7/1991 | Morganstein |
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow et al. |
| D338,889 S | 8/1993 | Fuqua et al. |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,329,578 A | 7/1994 | Brennan et al. |
| 5,333,152 A | 7/1994 | Wilber |
| 5,333,186 A | 7/1994 | Gupta |
| 5,338,889 A | 8/1994 | Vora et al. |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | De Framond |
| 5,467,388 A | 11/1995 | Redd, Jr. et al. |
| 5,475,748 A | 12/1995 | Jones et al. |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew et al. |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,537,470 A | 7/1996 | Lee |
| 5,539,809 A | 7/1996 | Mayer |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,563,936 A | 10/1996 | Washington |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| D383,466 S | 9/1997 | Burrell et al. |
| 5,668,852 A | 9/1997 | Holmes |
| 5,696,809 A | 12/1997 | Voit |
| 5,696,815 A | 12/1997 | Smyk |
| 5,699,413 A | 12/1997 | Sridhar |
| 5,699,523 A | 12/1997 | Li et al. |
| 5,701,301 A | 12/1997 | Weisser, Jr. |
| 5,703,934 A | 12/1997 | Zicker et al. |
| 5,703,943 A | 12/1997 | Otto |
| H1714 H | 3/1998 | Partridge, III |
| 5,724,412 A | 3/1998 | Srinivasan |
| 5,734,706 A | 3/1998 | Windsor et al. |
| 5,742,668 A | 4/1998 | Pepe et al. |
| 5,742,905 A | 4/1998 | Pepe et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang et al. |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan et al. |
| 5,802,160 A | 9/1998 | Kugell et al. |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi |
| 5,859,903 A | 1/1999 | Lee |
| 5,872,834 A | 2/1999 | Teitelbaum |
| 5,872,934 A | 2/1999 | Whitehouse et al. |
| 5,875,239 A | 2/1999 | Koralewski et al. |
| 5,875,241 A | 2/1999 | Chang et al. |
| 5,878,036 A | 3/1999 | Spartz et al. |
| 5,883,942 A | 3/1999 | Lim et al. |
| 5,884,144 A | 3/1999 | Chavez, Jr. et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,918,213 A | 6/1999 | Bernard et al. |
| 5,923,744 A | 7/1999 | Cheng et al. |
| 5,930,701 A | 7/1999 | Skog |
| 5,940,484 A | 8/1999 | DeFazio et al. |
| 5,943,416 A | 8/1999 | Gisby |
| 5,946,363 A | 8/1999 | Rominger et al. |
| 5,946,636 A | 8/1999 | Uyeno et al. |
| 5,946,684 A | 8/1999 | Lund |
| D413,605 S | 9/1999 | Thomas et al. |
| 5,948,040 A | 9/1999 | DeLorme et al. |
| 5,948,061 A | 9/1999 | Merriman et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,005,870 A | 12/1999 | Leung et al. |
| 6,006,087 A | 12/1999 | Amin |
| 6,009,321 A | 12/1999 | Wang et al. |
| 6,014,559 A | 1/2000 | Amin |
| 6,016,512 A | 1/2000 | Huitema |
| 6,021,188 A | 2/2000 | Meg |
| 6,021,427 A | 2/2000 | Spagna et al. |
| 6,031,899 A | 2/2000 | Wu |
| 6,044,148 A | 3/2000 | Bleile |
| 6,049,291 A | 4/2000 | Kikinis |

| | | |
|---|---|---|
| 6,058,171 A | 5/2000 | Hoopes |
| 6,061,434 A | 5/2000 | Corbett |
| 6,061,566 A | 5/2000 | Friman |
| 6,064,876 A | 5/2000 | Ishida et al. |
| 6,065,844 A | 5/2000 | Chen |
| 6,072,859 A | 6/2000 | Kong |
| 6,078,581 A | 6/2000 | Shtivelman et al. |
| 6,091,947 A | 7/2000 | Sumner |
| 6,094,478 A | 7/2000 | Shepherd et al. |
| 6,094,573 A | 7/2000 | Heinonen et al. |
| 6,094,574 A | 7/2000 | Vance et al. |
| 6,094,575 A | 7/2000 | Anderson et al. |
| 6,101,246 A | 8/2000 | Heinmiller et al. |
| 6,104,784 A | 8/2000 | Robbins et al. |
| 6,104,800 A | 8/2000 | Benson |
| 6,108,630 A | 8/2000 | Kuechler et al. |
| 6,111,939 A | 8/2000 | Brabanec |
| 6,134,235 A | 10/2000 | Goldman et al. |
| 6,134,311 A | 10/2000 | Ekstrom |
| 6,137,870 A | 10/2000 | Scherer |
| 6,137,871 A | 10/2000 | Maier et al. |
| 6,141,341 A | 10/2000 | Jones et al. |
| 6,141,409 A | 10/2000 | Madoch et al. |
| 6,144,644 A | 11/2000 | Bajzath et al. |
| 6,154,531 A | 11/2000 | Clapper |
| 6,160,876 A | 12/2000 | Moss et al. |
| 6,161,021 A | 12/2000 | Akpa |
| 6,163,595 A | 12/2000 | Parker et al. |
| 6,163,607 A | 12/2000 | Bogart et al. |
| 6,163,691 A | 12/2000 | Buettner et al. |
| 6,167,254 A | 12/2000 | Chavez, Jr. et al. |
| 6,169,911 B1 | 1/2001 | Wagner et al. |
| 6,173,049 B1 | 1/2001 | Malik |
| 6,178,232 B1 | 1/2001 | Latter et al. |
| 6,181,928 B1 | 1/2001 | Moon |
| D437,879 S | 2/2001 | Weinandt |
| 6,185,289 B1 | 2/2001 | Hetz et al. |
| 6,185,426 B1 | 2/2001 | Alperovich |
| 6,192,115 B1 | 2/2001 | Toy et al. |
| 6,192,116 B1 | 2/2001 | Mayak |
| 6,198,480 B1 | 3/2001 | Cotugno et al. |
| 6,198,920 B1 | 3/2001 | Doviak et al. |
| 6,202,023 B1 | 3/2001 | Hancock et al. |
| 6,219,407 B1 | 4/2001 | Kanevsky et al. |
| 6,219,413 B1 | 4/2001 | Burg |
| 6,222,826 B1 | 4/2001 | Faynberg et al. |
| 6,226,367 B1 | 5/2001 | Smith et al. |
| 6,226,369 B1 | 5/2001 | Lim et al. |
| 6,226,399 B1 | 5/2001 | Robinson |
| 6,229,883 B1 | 5/2001 | Kakizaki et al. |
| 6,230,006 B1 | 5/2001 | Keenan et al. |
| 6,233,325 B1 | 5/2001 | Frech et al. |
| 6,236,975 B1 | 5/2001 | Boe et al. |
| 6,243,448 B1 | 6/2001 | Corbett et al. |
| 6,243,461 B1 | 6/2001 | Hwang et al. |
| 6,246,976 B1 | 6/2001 | Mukaigawa et al. |
| 6,252,952 B1 | 6/2001 | Kung et al. |
| 6,256,671 B1 | 7/2001 | Strentzsch et al. |
| 6,262,987 B1 | 7/2001 | Mogul |
| 6,266,399 B1 | 7/2001 | Weller et al. |
| 6,278,704 B1 | 8/2001 | Creamer et al. |
| 6,278,862 B1 | 8/2001 | Henderson |
| 6,282,275 B1 | 8/2001 | Gurbani et al. |
| 6,292,479 B1 | 9/2001 | Bartholomew et al. |
| 6,292,549 B1 | 9/2001 | Lung et al. |
| 6,295,502 B1 | 9/2001 | Hancock et al. |
| 6,301,342 B1 | 10/2001 | Ander et al. |
| 6,301,350 B1 | 10/2001 | Henningson et al. |
| 6,304,644 B2 | 10/2001 | Karnowski |
| 6,310,943 B1 | 10/2001 | Kowalski |
| 6,311,057 B1 | 10/2001 | Barvesten |
| 6,317,488 B1 | 11/2001 | DePond et al. |
| 6,317,781 B1 | 11/2001 | De Boor et al. |
| 6,324,263 B1 | 11/2001 | Sherwood et al. |
| 6,324,271 B1 | 11/2001 | Sawyer et al. |
| 6,327,347 B1 | 12/2001 | Gutzmann |
| 6,332,021 B2 | 12/2001 | Latter et al. |
| 6,333,973 B1 | 12/2001 | Smith et al. |
| 6,337,904 B1 | 1/2002 | Gisby |
| 6,337,979 B1 | 1/2002 | Nakayasu |
| 6,339,639 B1 | 1/2002 | Henderson |
| 6,341,161 B1 * | 1/2002 | Latter et al. ............... 379/142.01 |
| 6,345,187 B1 | 2/2002 | Berthoud et al. |
| 6,347,136 B1 | 2/2002 | Horan |
| 6,351,637 B1 | 2/2002 | Lee |
| 6,353,664 B1 | 3/2002 | Cannon et al. |
| 6,361,637 B2 | 3/2002 | Martin et al. |
| 6,363,140 B1 | 3/2002 | Pinard |
| 6,363,411 B1 | 3/2002 | Dugan et al. |
| 6,363,664 B1 | 4/2002 | Brutsaert |
| 6,366,661 B1 | 4/2002 | Devillier et al. |
| 6,366,772 B1 | 4/2002 | Arnson |
| 6,377,807 B1 | 4/2002 | Iparrea et al. |
| 6,377,979 B1 | 4/2002 | Yamashita et al. |
| 6,389,124 B1 | 5/2002 | Schnarel et al. |
| 6,389,132 B1 | 5/2002 | Price |
| 6,400,809 B1 | 6/2002 | Bossemeyer, Jr. et al. |
| 6,400,947 B1 | 6/2002 | Bright et al. |
| 6,404,868 B1 | 6/2002 | Beamish et al. |
| 6,404,875 B2 | 6/2002 | Malik et al. |
| 6,411,692 B1 | 6/2002 | Scherer |
| 6,421,425 B1 | 7/2002 | Bossi et al. |
| 6,422,263 B1 | 7/2002 | Spicer |
| 6,427,003 B1 | 7/2002 | Corbett et al. |
| 6,427,064 B1 | 7/2002 | Henderson |
| 6,434,394 B1 | 8/2002 | Grundvig et al. |
| 6,437,879 B1 | 8/2002 | Temple |
| 6,438,216 B1 | 8/2002 | Aktas |
| 6,438,217 B1 | 8/2002 | Huna |
| 6,438,584 B1 | 8/2002 | Powers |
| 6,442,249 B1 | 8/2002 | Miller, Jr. |
| 6,442,262 B1 | 8/2002 | Moss et al. |
| 6,442,263 B1 | 8/2002 | Beaton et al. |
| 6,442,283 B1 | 8/2002 | Tewfik et al. |
| 6,445,781 B1 | 9/2002 | Heinmiller et al. |
| 6,449,351 B1 | 9/2002 | Moss et al. |
| 6,449,361 B1 | 9/2002 | Okuda |
| 6,462,646 B2 | 10/2002 | Helferich |
| 6,466,653 B1 | 10/2002 | Hamrick et al. |
| 6,477,246 B1 | 11/2002 | Dolan et al. |
| 6,480,589 B1 | 11/2002 | Lee et al. |
| 6,483,898 B2 | 11/2002 | Lew et al. |
| 6,493,430 B2 | 12/2002 | Leuca et al. |
| 6,493,431 B1 | 12/2002 | Troen-Krasnow et al. |
| 6,493,437 B1 | 12/2002 | Olshansky |
| 6,493,439 B2 | 12/2002 | Lung et al. |
| 6,494,953 B2 | 12/2002 | Hayes et al. |
| 6,496,569 B2 | 12/2002 | Pelletier et al. |
| 6,496,571 B1 | 12/2002 | Wilson |
| 6,496,692 B1 | 12/2002 | Shanahan |
| 6,498,841 B2 | 12/2002 | Bull et al. |
| 6,507,737 B1 | 1/2003 | Laham et al. |
| 6,529,500 B1 | 3/2003 | Pandharipande |
| 6,529,591 B1 | 3/2003 | Dosani et al. |
| 6,532,490 B1 | 3/2003 | Lewis et al. |
| 6,539,080 B1 | 3/2003 | Bruce et al. |
| 6,542,583 B1 | 4/2003 | Taylor |
| 6,542,586 B1 | 4/2003 | Helstab |
| 6,542,591 B1 | 4/2003 | Amro et al. |
| 6,542,602 B1 | 4/2003 | Elazar |
| 6,542,812 B1 | 4/2003 | Obradovich et al. |
| 6,546,092 B2 | 4/2003 | Corbett et al. |
| 6,549,621 B1 | 4/2003 | Christie, IV et al. |
| 6,553,110 B1 * | 4/2003 | Peng ..................... 379/210.03 |
| 6,553,221 B2 | 4/2003 | Nakamura et al. |
| 6,556,540 B1 | 4/2003 | Mawhinney et al. |
| 6,560,317 B1 | 5/2003 | Quagliana |
| 6,560,327 B1 | 5/2003 | McConnell |
| 6,566,995 B2 | 5/2003 | Furuuchi et al. |
| 6,570,971 B2 | 5/2003 | Latter et al. |
| 6,570,974 B1 | 5/2003 | Gerszberg et al. |
| 6,574,319 B2 | 6/2003 | Latter et al. |
| 6,580,904 B2 | 6/2003 | Cox et al. |
| 6,584,490 B1 | 6/2003 | Schuster et al. |
| 6,587,458 B1 | 7/2003 | Burg et al. |
| 6,590,970 B1 | 7/2003 | Cai et al. |
| 6,597,905 B1 | 7/2003 | Hijii |
| 6,603,840 B2 | 8/2003 | Fellingham et al. |

| | | | | | | |
|---|---|---|---|---|---|---|
| 6,603,854 B1 | 8/2003 | Judkins et al. | 6,898,275 B2 | 5/2005 | Dolan et al. | |
| 6,608,891 B1 | 8/2003 | Pelletier et al. | 6,904,137 B2 | 6/2005 | Brandt et al. | |
| 6,618,474 B1 | 9/2003 | Reese | 6,904,276 B1 | 6/2005 | Freeman et al. | |
| 6,625,595 B1 | 9/2003 | Anderson et al. | 6,907,034 B1 | 6/2005 | Begis | |
| 6,631,181 B1 | 10/2003 | Bates et al. | 6,909,777 B2 | 6/2005 | Latter et al. | |
| 6,633,633 B1 | 10/2003 | Bedingfield | 6,914,953 B2 | 7/2005 | Boerstler | |
| 6,639,979 B1 | 10/2003 | Kim | 6,917,960 B1 * | 7/2005 | Decasper et al. | 709/203 |
| 6,650,743 B2 | 11/2003 | Heinmiller et al. | 6,922,411 B1 | 7/2005 | Taylor | |
| 6,659,597 B2 | 12/2003 | Murata et al. | 6,928,154 B1 | 8/2005 | Cheaito et al. | |
| 6,661,785 B1 | 12/2003 | Zhang et al. | 6,931,007 B2 | 8/2005 | Jones | |
| 6,665,378 B1 | 12/2003 | Spielman et al. | 6,947,531 B1 | 9/2005 | Lewis et al. | |
| 6,665,388 B2 | 12/2003 | Bedingfield | 6,952,469 B2 | 10/2005 | Han | |
| 6,665,715 B1 | 12/2003 | Houri | 6,970,546 B2 | 11/2005 | Kent, Jr. et al. | |
| 6,677,894 B2 | 1/2004 | Sheynblat et al. | 6,977,993 B2 | 12/2005 | Starbuck et al. | |
| 6,683,870 B1 | 1/2004 | Archer | 6,996,211 B2 | 2/2006 | Reynolds et al. | |
| 6,687,341 B1 | 2/2004 | Koch et al. | 7,012,999 B2 | 3/2006 | Ruckart | |
| 6,697,357 B2 | 2/2004 | Emerson, III | 7,016,482 B2 | 3/2006 | Moss et al. | |
| 6,701,160 B1 | 3/2004 | Pinder et al. | 7,020,250 B2 | 3/2006 | Lew et al. | |
| 6,714,519 B2 | 3/2004 | Luzzatti et al. | 7,027,408 B2 | 4/2006 | Nabkel et al. | |
| 6,718,021 B2 | 4/2004 | Crockett et al. | 7,027,569 B2 | 4/2006 | Price | |
| 6,721,407 B1 | 4/2004 | Michelena | 7,076,051 B2 | 7/2006 | Brown et al. | |
| 6,724,872 B1 | 4/2004 | Moore et al. | 7,079,837 B1 | 7/2006 | Sherman et al. | |
| 6,725,872 B2 | 4/2004 | Kindell et al. | 7,085,257 B1 | 8/2006 | Karves et al. | |
| 6,728,355 B2 | 4/2004 | Kowalski | 7,085,358 B2 | 8/2006 | Ruckart et al. | |
| 6,728,360 B1 | 4/2004 | Brennan | 7,085,578 B2 | 8/2006 | Barclay et al. | |
| 6,728,365 B1 | 4/2004 | Li et al. | 7,095,715 B2 | 8/2006 | Buckman et al. | |
| 6,731,727 B2 | 5/2004 | Corbett et al. | 7,097,169 B2 | 8/2006 | Mueller | |
| 6,732,188 B1 | 5/2004 | Flockhart et al. | 7,103,167 B2 | 9/2006 | Brahm et al. | |
| 6,738,615 B1 | 5/2004 | Chow et al. | 7,103,662 B2 | 9/2006 | Ray et al. | |
| 6,751,457 B1 | 6/2004 | Martin | 7,107,077 B2 | 9/2006 | Lee | |
| 6,757,274 B1 | 6/2004 | Bedingfield et al. | 7,113,577 B2 | 9/2006 | Cook et al. | |
| 6,757,530 B2 | 6/2004 | Rouse et al. | 7,127,488 B1 | 10/2006 | Scott et al. | |
| 6,757,732 B1 | 6/2004 | Sollee et al. | 7,139,374 B1 | 11/2006 | Scott et al. | |
| 6,757,740 B1 | 6/2004 | Parekh et al. | 7,152,118 B2 | 12/2006 | Anderson, IV et al. | |
| 6,760,413 B2 | 7/2004 | Cannon et al. | 7,155,211 B2 | 12/2006 | Mun et al. | |
| 6,765,998 B2 | 7/2004 | Bruce et al. | 7,184,533 B1 | 2/2007 | Shaffer et al. | |
| D494,953 S | 8/2004 | Leung | 7,200,673 B1 | 4/2007 | Augart | |
| 6,771,755 B1 | 8/2004 | Simpson | 7,215,750 B2 | 5/2007 | Nguyen et al. | |
| 6,771,956 B1 | 8/2004 | Beeler | 7,228,129 B1 | 6/2007 | Ward et al. | |
| 6,775,366 B1 | 8/2004 | Cobbett et al. | 7,254,226 B1 | 8/2007 | Roberts et al. | |
| 6,775,371 B2 | 8/2004 | Elsey et al. | 7,313,227 B2 | 12/2007 | Jones | |
| 6,775,540 B2 | 8/2004 | Iyer | 7,315,614 B2 | 1/2008 | Bedingfield, Sr. et al. | |
| 6,778,524 B1 | 8/2004 | Augart | 7,386,319 B2 | 6/2008 | Rogalski et al. | |
| 6,779,020 B1 | 8/2004 | Henrick | 7,403,768 B2 | 7/2008 | Bedingfield, Sr. et al. | |
| 6,785,301 B1 | 8/2004 | Chapman et al. | 7,418,096 B2 | 8/2008 | Moton et al. | |
| 6,785,368 B1 | 8/2004 | Eason et al. | 7,443,964 B2 | 10/2008 | Urban et al. | |
| 6,785,540 B1 | 8/2004 | Wichelman | 7,613,810 B2 | 11/2009 | Romero et al. | |
| 6,792,266 B1 | 9/2004 | Masuda et al. | 7,623,645 B1 | 11/2009 | Scott et al. | |
| 6,798,841 B2 | 9/2004 | Hansen | 7,631,047 B1 | 12/2009 | Adamczyk et al. | |
| 6,798,876 B1 | 9/2004 | Bala | 7,653,191 B1 | 1/2010 | Glasser et al. | |
| 6,798,879 B1 | 9/2004 | Beham | 7,672,444 B2 | 3/2010 | Perrella et al. | |
| 6,804,503 B2 | 10/2004 | Shohara et al. | 2001/0002209 A1 | 5/2001 | Han | |
| 6,807,267 B2 | 10/2004 | Moss et al. | 2001/0005854 A1 | 6/2001 | Murata et al. | |
| 6,810,077 B1 | 10/2004 | Dezonno | 2001/0006519 A1 | 7/2001 | Voit | |
| 6,810,115 B2 | 10/2004 | Fukuda | 2001/0036174 A1 | 11/2001 | Herring | |
| 6,813,344 B1 | 11/2004 | Lemke | 2001/0044898 A1 | 11/2001 | Benussi et al. | |
| 6,816,481 B1 | 11/2004 | Adams et al. | 2001/0048737 A1 | 12/2001 | Goldberg et al. | |
| 6,818,474 B2 | 11/2004 | Kim et al. | 2002/0007400 A1 | 1/2002 | Pedersen | |
| 6,826,270 B1 | 11/2004 | Welch et al. | 2002/0009184 A1 | 1/2002 | Shnier | |
| 6,826,271 B1 | 11/2004 | Kanabar et al. | 2002/0012426 A1 | 1/2002 | Gupton | |
| 6,826,617 B1 | 11/2004 | Ansell et al. | 2002/0016748 A1 | 2/2002 | Emodi et al. | |
| 6,829,348 B1 | 12/2004 | Schroeder et al. | 2002/0023265 A1 | 2/2002 | Metcalf | |
| 6,830,595 B2 | 12/2004 | Reynolds, III | 2002/0041605 A1 | 4/2002 | Benussi et al. | |
| 6,831,974 B1 | 12/2004 | Watson et al. | 2002/0055926 A1 | 5/2002 | Dan et al. | |
| 6,842,512 B2 | 1/2005 | Pedersen | 2002/0067816 A1 | 6/2002 | Bushnell | |
| 6,845,151 B2 | 1/2005 | Peng | 2002/0077102 A1 | 6/2002 | Achuthan et al. | |
| 6,845,512 B2 | 1/2005 | Horng et al. | 2002/0082050 A1 | 6/2002 | Mountney et al. | |
| 6,853,710 B2 | 2/2005 | Harris | 2002/0085687 A1 | 7/2002 | Contractor et al. | |
| 6,853,711 B2 | 2/2005 | Brisebois et al. | 2002/0091777 A1 | 7/2002 | Schwartz | |
| 6,856,677 B2 | 2/2005 | Leijonhufvud | 2002/0118812 A1 | 8/2002 | Contractor | |
| 6,859,527 B1 | 2/2005 | Banks et al. | 2002/0119430 A1 | 8/2002 | Szynalski | |
| 6,865,266 B1 | 3/2005 | Pershan | 2002/0120629 A1 | 8/2002 | Leonard | |
| 6,865,384 B2 | 3/2005 | Sagi et al. | 2002/0122401 A1 | 9/2002 | Xiang et al. | |
| 6,868,155 B1 | 3/2005 | Cannon et al. | 2002/0125929 A1 | 9/2002 | Chen et al. | |
| 6,870,924 B1 | 3/2005 | Ukon | 2002/0128033 A1 | 9/2002 | Burgess | |
| 6,871,076 B2 | 3/2005 | Samn | 2002/0136381 A1 | 9/2002 | Shaffer et al. | |
| 6,888,927 B1 | 5/2005 | Cruickshank et al. | 2002/0171581 A1 | 11/2002 | Sheynblat et al. | |
| 6,888,972 B2 | 5/2005 | Berg et al. | 2002/0172338 A1 | 11/2002 | Lee et al. | |
| 6,891,940 B1 | 5/2005 | Bhandari et al. | 2002/0176563 A1 | 11/2002 | Kryvossidis et al. | |

| | | | |
|---|---|---|---|
| 2002/0183098 A1 | 12/2002 | Lee et al. | |
| 2002/0188443 A1 | 12/2002 | Reddy et al. | |
| 2002/0197991 A1 | 12/2002 | Anvekar et al. | |
| 2003/0002633 A1 | 1/2003 | Kredo et al. | |
| 2003/0006912 A1 | 1/2003 | Brescia | |
| 2003/0012353 A1 | 1/2003 | Tang et al. | |
| 2003/0016143 A1 | 1/2003 | Ghazarian | |
| 2003/0016800 A1 | 1/2003 | Fukuda | |
| 2003/0021290 A1 | 1/2003 | Jones | |
| 2003/0026416 A1 | 2/2003 | Fusco | |
| 2003/0032414 A1 | 2/2003 | Melaku et al. | |
| 2003/0043974 A1 | 3/2003 | Emerson, III | |
| 2003/0050100 A1 | 3/2003 | Dent | |
| 2003/0053602 A1 | 3/2003 | Stuckman et al. | |
| 2003/0063730 A1 | 4/2003 | Woodring | |
| 2003/0063731 A1 | 4/2003 | Woodring | |
| 2003/0065776 A1 | 4/2003 | Malik et al. | |
| 2003/0068020 A1 | 4/2003 | Hamrick et al. | |
| 2003/0092384 A1 | 5/2003 | Ross, III | |
| 2003/0092432 A1 | 5/2003 | Hwang | |
| 2003/0095650 A1 | 5/2003 | Mize | |
| 2003/0096581 A1 | 5/2003 | Takamine | |
| 2003/0103608 A1 | 6/2003 | Pearson et al. | |
| 2003/0112938 A1 | 6/2003 | Kanakubo et al. | |
| 2003/0119522 A1 | 6/2003 | Barclay et al. | |
| 2003/0133543 A1 | 7/2003 | Khakoo et al. | |
| 2003/0133553 A1 | 7/2003 | Khakoo et al. | |
| 2003/0133653 A1 | 7/2003 | Barros et al. | |
| 2003/0135562 A1 | 7/2003 | Himmel et al. | |
| 2003/0148758 A1 | 8/2003 | McMullin | |
| 2003/0152207 A1 | 8/2003 | Ryan | |
| 2003/0187949 A1 | 10/2003 | Bhatt et al. | |
| 2003/0193967 A1 | 10/2003 | Fenton et al. | |
| 2003/0196206 A1 | 10/2003 | Shusman | |
| 2003/0198322 A1 | 10/2003 | White, Jr. | |
| 2003/0215070 A1 | 11/2003 | Akhteruzzaman et al. | |
| 2003/0219107 A1 | 11/2003 | Richardson et al. | |
| 2004/0049545 A1 | 3/2004 | Lockridge et al. | |
| 2004/0101118 A1 | 5/2004 | Powell | |
| 2004/0101124 A1 | 5/2004 | Koch et al. | |
| 2004/0109558 A1 | 6/2004 | Koch | |
| 2004/0114603 A1 | 6/2004 | Suhail et al. | |
| 2004/0114730 A1 | 6/2004 | Koch et al. | |
| 2004/0120475 A1 | 6/2004 | Bauer et al. | |
| 2004/0125929 A1 | 7/2004 | Pope | |
| 2004/0171370 A1 | 9/2004 | Natarajan | |
| 2004/0181587 A1 | 9/2004 | Cao et al. | |
| 2004/0202298 A1 | 10/2004 | Lopez et al. | |
| 2004/0202299 A1 | 10/2004 | Schwartz | |
| 2004/0208301 A1 | 10/2004 | Urban et al. | |
| 2004/0208302 A1 | 10/2004 | Urban et al. | |
| 2004/0209604 A1 | 10/2004 | Urban et al. | |
| 2004/0209605 A1 | 10/2004 | Urban et al. | |
| 2004/0209640 A1 | 10/2004 | Urban et al. | |
| 2004/0213207 A1 | 10/2004 | Silver et al. | |
| 2004/0213396 A1 | 10/2004 | MacNamara et al. | |
| 2004/0218743 A1 | 11/2004 | Hussain et al. | |
| 2004/0233892 A1 | 11/2004 | Roberts et al. | |
| 2004/0242212 A1 | 12/2004 | Bacon et al. | |
| 2004/0248560 A1 | 12/2004 | Bedingfield, Sr. | |
| 2005/0068166 A1 | 3/2005 | Baker | |
| 2005/0073999 A1 | 4/2005 | Koch | |
| 2005/0100158 A1 | 5/2005 | Kreiner et al. | |
| 2005/0107074 A1 | 5/2005 | Zellner | |
| 2005/0147228 A1 | 7/2005 | Perrella et al. | |
| 2005/0157861 A1 | 7/2005 | Bossemeyer et al. | |
| 2006/0002540 A1 | 1/2006 | Kreiner et al. | |
| 2006/0013375 A1 | 1/2006 | Smith et al. | |
| 2006/0029209 A1 | 2/2006 | Moton et al. | |
| 2006/0062374 A1 | 3/2006 | Gupta | |
| 2006/0152207 A1 | 7/2006 | Riebel et al. | |
| 2006/0153173 A1 | 7/2006 | Beck et al. | |
| 2006/0270392 A1 | 11/2006 | Scott et al. | |
| 2007/0064911 A1 | 3/2007 | Bedingfield, Sr. et al. | |
| 2007/0121825 A1 | 5/2007 | Walsh et al. | |

FOREIGN PATENT DOCUMENTS

| | | |
|---|---|---|
| KR | 2002014945 | 2/2002 |
| WO | 97/50225 | 12/1997 |
| WO | 03/030501 A1 | 4/2003 |
| WO | 03/030502 A1 | 4/2003 |
| WO | 03/090432 A1 | 10/2003 |

OTHER PUBLICATIONS

Aastra Telecom, Press Release, Aastra Telecom Introduces CNX Conference Bridge, Aug. 29, 2005, 1 page.

Address Allocation for Private Internets, Rekhter et al., pp. 1-8, Feb. 1996.

Bellcore Specification TR-NWT-000310, Calling Number Delivery, Issue 4, Dec. 1992.

Bellcore Specification TR-NWT-001188, Calling Name Delivery Generic Requirements, Issue 1, Dec. 1991.

T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.

J. Boswell, G. Lingenauber, An Advanced HF Receiver Design, Jul. 1994, IEE, Conference Publication. No. 392, pp. 41-47*.

Mark H. Norris, Transmitter Architectures, 1998, IEE, pp. 4/1-4/6*.

OKI Silicon Solutions Company, Japan Site, "Multi-Lingual Text-to-Speech Processor ML2110;" [online]; [retrieved on Aug. 31, 2005] retrieved from the Internet http://www.//oki.com/semi/English/m12110/htm.

RBS 884 Pico System Description, Author Unknown, Ericsson 1/1551-AE/LZB 119 2269 Uae Rev A, Apr. 23, 1998.

SIP: Session Initiation Protocol, Handley et al., Mar. 1999*.

Slawson, "Caller ID Basics;" [online]; [retrieved on Oct. 31, 2001]; retrieved from the Internet http://www.testmark.com/develop/tml_callerid_cnt.html.

SmartHome "The Caller ID System that Speaks for Itself!;" [online]; [retrieved on Aug. 31, 2005]; retrieved from the Internet http://www.smarthome.com/5154.html.

SmartHome "The Caller ID System that SPEAKS of Itself! Talking Caller ID;" [online]; [retrieved on Nov. 5, 2001]; http://www.smarthome.com/5154.html.

"Talking Caller ID by Stealth Software;" [online]; [retrieved on Nov. 5, 2001]; retrieved from the Internet http://www.talkingcallerid.com/.

The IP Network Address Translator (NAT), Egevang et al., May 1994*.

"Time Division Multiple Access (TDMA);" [online]; [retrieved on Mar. 6, 2003]; retrieved from the Internet http://www.iec.org/online/tutorials/tdma/.

"Venture IP Telephone System" Aastra [online]; [retrieved on Aug. 31, 2001]; retrieved from the Internet http://www.aastra.com/products/callerids/voicecallerid/be-6060.html.

"Venture IP Telephone System" Aastra; [online]; [retrieved on Nov. 5, 2001]; retrieved from the Internet http://www.aastra.com/products/callerids/voicecallerid/be-6090.html.

Voice-9090 "Talking Caller ID", Aastra Telecom-Talking Caller ID-Voice 9090, [online]; [retrieved on Nov. 5, 2001]; http://www.aastra.com/products/callerids/voicecallerid/be-9090.html.

International Search Report PCT/US02/30068, Dec. 9, 2002.

International Search Report PCT/US02/29988, Sep. 23, 2002.

U.S. Appl. No. 10/032,724, filed Dec. 27, 2001 Harold et al.

U.S. Appl. No. 10/200,906, filed Jul. 23, 2002 Scott et al.

U.S. Appl. No. 10/144,555, filed May 13, 2002 Koch et al.

U.S. Appl. No. 10/144,556, filed May 13, 2002 Koch et al.

U.S. Appl. No. 10/152,544, filed May 21, 2002 Alston et al.

U.S. Appl. No. 10/200,874, filed Jul. 23, 2002 Scott et al.

U.S. Appl. No. 09/812,338, filed Mar. 19, 2001 Smith.

* cited by examiner

SYSTEMS AND METHODS FOR PROVIDING USER PROFILE INFORMATION IN CONJUNCTION WITH AN ENHANCED CALLER INFORMATION SYSTEM

CROSS REFERENCE TO RELATED APPLICATIONS

This application is a continuation of U.S. patent application Ser. No. 09/964,390 filed Sep. 28, 2001, the contents of which are incorporated herein in their entirety.

The present application is related to co-pending commonly owned application of Larry D. Woodring, entitled "Systems and Methods for Recording and Providing Enhanced Caller Information in an Advanced Intelligent Network", U.S. application Ser. No. 09/964,392, and which is herein incorporated by reference in its entirety.

BACKGROUND

1. Field of the Invention

The present invention relates generally to telecommunications systems, and more particularly, the present invention relates to caller identification systems.

2. Background of the Invention

"Caller-id" services such as calling number delivery (CND) and calling name delivery (CNAM) are well-known services implemented in Advanced Intelligent Networks ("AIN"). The implementation and operation of CND systems are described in Bellcore Specification TR-NWT-000031, Calling Number Delivery which is incorporated herein by reference in its entirety. CNAM systems are described in Bellcore Specification TR-NWT-001188, Calling Name Delivery Generic Requirements, which is incorporated herein by reference in its entirety.

Caller-id services operate by providing a signal to a caller-id display device attached to a subscriber's telephone line. The device interprets the signal and displays or stores the information for future display to the subscriber. Conventional caller-id services are not available when the subscriber is away from the home or office. That is, subscribers typically cannot access the information stored by the caller-id device without being physically present to operate the device. Another problem with conventional caller-id services is the limited amount of information provided to subscribers. Caller-id devices and public switched telephone network (PSTN) systems that provide conventional caller-id services typically support only text messages. Moreover, the text messages are typically limited to fifteen text-based characters. Caller-id devices typically have only a limited amount of memory so as to make them inadequate for long-term record-keeping purposes.

Some in the art have sought to overcome some of these problems by designing computer-based software and hardware systems which are connected to the subscriber's telephone line. When an incoming call is received, the signal destined for the caller-id device is intercepted and the information can be input into a database to make a log of all inbound calls. These systems have been known to fail and result in the subscriber's telephone being tied up until the subscriber is made aware of the problem. Also, such end-user solutions do not take full advantage of multimedia resources available via modem communications networks.

SUMMARY OF THE INVENTION

Embodiments of the present invention comprise systems and methods for providing user profile information in conjunction with an enhanced caller information system. The methods include provisioning a trigger on a subscriber's telephone line at a service switching point (SSP) and receiving a call from a caller to the subscriber's SSP. In response to the trigger, the SSP sends a query to a service control point (SCP). Upon receiving the query, the SCP sends an information message to a server for delivery to the subscriber upon request. The information message may include, for example, calling number, calling name, caller's address, caller's location (for mobile callers), calling date, calling time, call length, call ending time, and the like. The information on the server can be cross-referenced with other useful information such as a map of the caller's address or location.

Systems embodying the present invention may include a trigger provisioned on a subscriber's telephone line at the subscriber's SSP. When the SSP receives a call for the subscriber, the call hits the trigger, causing the SSP to send a query to an SCP. The query includes calling party number information and called party number information. The SCP responds to the query in the usual manner (e.g., by providing calling name information, if available), and additionally, the SCP sends an information message to a server. The server stores the information received from the SCP and, upon request, provides the subscriber with enhanced caller-id information. The server may also be used to maintain long-term logs recording the subscriber's caller activity. Additionally, the subscriber may download caller information for use with other applications.

Embodiments of the present invention may also be implemented for wireless subscribers and/or wireless callers. Further, embodiments may include servers adapted for access via the worldwide web or other commonly used applications accessible via communications networks, such as for example, the Internet. In another embodiment the server may be adapted to provide information to the subscriber via a wireless device. In another embodiment a subscriber may access the server via a telephone call and receive calling information via voice message.

DETAILED DESCRIPTION OF AN EMBODIMENT OF THE INVENTION

Embodiments of the present invention allow users to submit profile information providing enhanced caller information that may be accessed by others during or after a telephone call. Embodiments of the present invention utilize AIN systems and data network servers to provide a server-based enhanced caller information service. The service enables subscribers to receive selected profile information in addition to standard calling number and calling name records for incoming calls. Examples of user profile information may include photos, links to personal web sites, images of business cards, or other multi-media content. By receiving such user profile information together with caller identification information, subscribers may be provided with a full range of detailed information and graphical images related to the calling party.

In embodiments of the present invention the server comprises a caller information application adapted or programmed to receive information from users and to provide the information to subscribers of the service in conjunction with caller information services. In exemplary embodiments of the present invention the server may be a web-server allowing subscribers to monitor their telephone records from any location from which access to the server is available. In other exemplary embodiments, the server may comprise, for example a mail server or a file transfer server, accessed by subscribers and users via client application programs installed on their local computer systems.

As used herein, the terms "caller" and "user" are both used to refer to a person, company, organization or other entity that provides user profile information to be presented to a subscriber in conjunction with enhanced caller information according to the present invention. As used herein, "subscriber" refers to a person, company, organization, or other entity that receives user profile information in conjunction with enhanced caller information according to the present invention.

Figure 1:
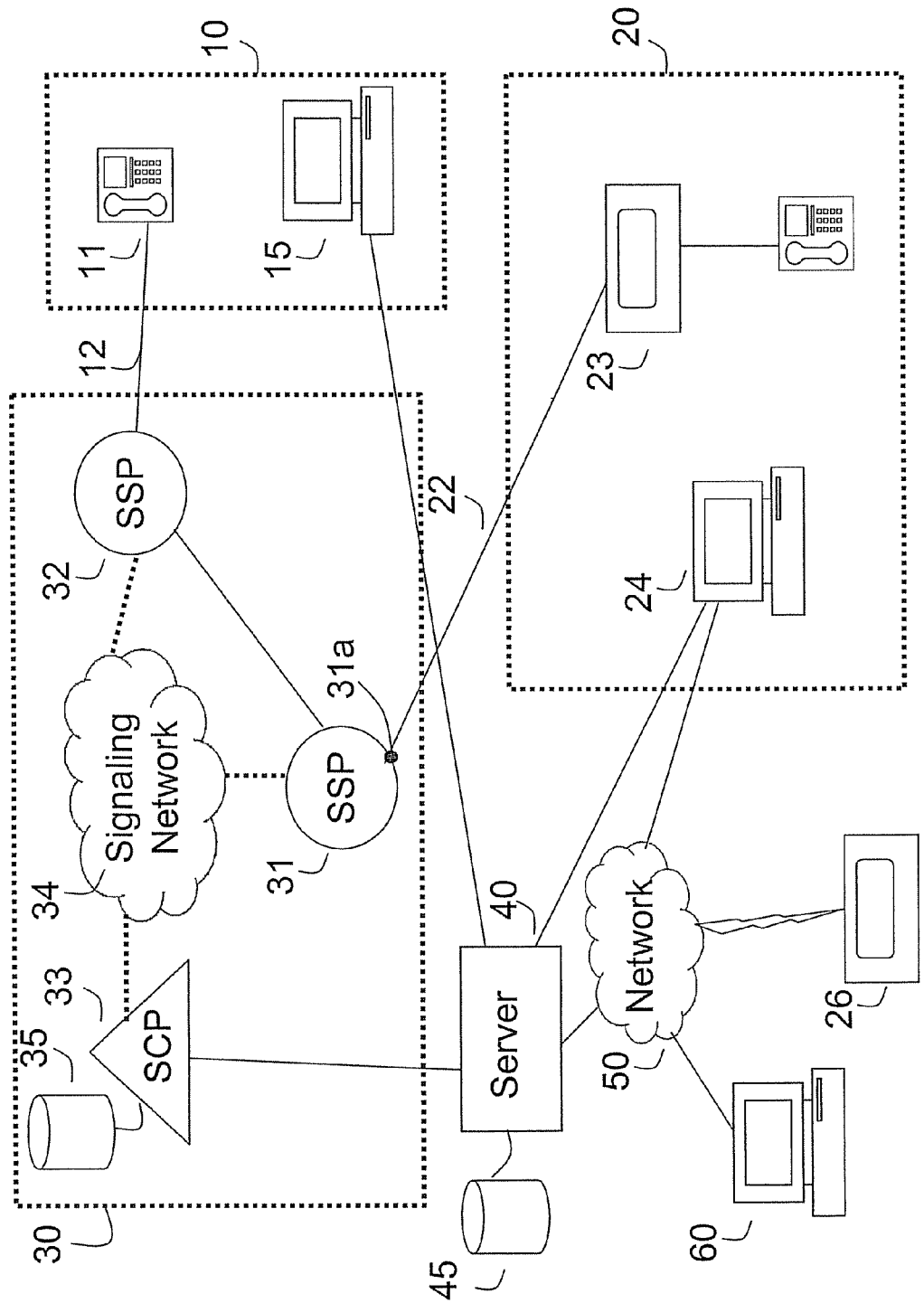
FIG. 1 is a schematic diagram showing the operation of an exemplary embodiment of the present invention.

FIG. 1 is a schematic diagram showing an exemplary embodiment of the present invention. In this embodiment caller 10 uses computer 15 to login to server 40 to provide or update user profile information. For example, user 10 may provide her photograph and photographs of her home and children. User 10 may opt to include other personal information, including, for example, a favorite quote, biographical information, and itinerary data for a planned trip. In another example, user 10 may incuse directions to his or her home of other detailed information. In yet another example, user 10 may provide an image of a business card or other identifying information. If, for example, user 10 is a business or other such entity, profile information may include a link to the company's web site, advertising information, pictures of products, or other multi-media advertising information, pictures of products, or other multi-media advertising information.

Caller 10 may setup his or her user profile to provide enhanced caller information to one or more called parties. That is, for example, the user profile may include one or more lists of full access called parties (identified, e.g., by a party's directory number (DN), one or more lists of partial access called parties, and one or more lists of blocked access called parties. User 10 may include a default access level such that any called numbers not on any higher-level list will receive only the default information which may comprise no information. For example, whenever caller 10 calls a party (i.e., dials the party's DN) on a full access list, the called party receives or may access all of user 10's profile information. In contrast when caller 10 calls a party on a different access list, the called party will only receive or access that material specifically allowed by user 10. Caller 10 may implement such multi-levels of access to control how much information is provided to called parties. This may be useful, for example, if user 10 includes highly personal information in his or her profile.

Operation of an Exemplary Embodiment

When caller 10 uses telephone 11 to place a call to subscriber 20, caller-id device 23 may receive the calling name and/or calling number information as it would in conventional caller-id services. However, in addition to sending the information to caller-id device 23, AIN 30 also sends the information to server 40.

Server 40 may be accessible from any computers used by user 10 or subscriber 20, such as, for example, computer 15 (located at user 10's premises) or computer 24 (located at subscriber 20's premises). As shown in FIG. 1, server 40 may be directly accessible by computers 15 and 24, or may be accessible via network 50. Network 50 may be any data communications network, such as, for example the well-known Internet. Additionally, user 10 or subscriber 20 may use some other computer 60 or wireless device 26 to provide or obtain the caller information via network 50, or direct access if server 40 is so configured.

Server 40 may optionally include access control systems to maintain the users' and subscribers' privacy. For example, server 40 may be programmed to verify user 10's identity and authorization prior to allowing the user profile information to be updated. Similarly, server 40 may be programmed to prompt subscriber 20 for a valid username and password or other security tokens before providing any information about callers to the subscriber's telephone line.

FIG. 1 shows caller 10 having wireline 12 connected to service switching point (SSP) 32. However, as would be apparent to those skilled in the art, caller 10 could be calling from any telephony device, including, for example, a wireless telephone, a wireless interactive pager, an Internet calling device, and the like. When the call reaches subscriber 20's central office, SSP 31, it encounters trigger 31a provisioned on subscriber 20's wire line 22. As a result, SSP 31 issues a query to service control point (SCP) 33 via signaling network 34. As known in the art, the trigger may be a termination attempt trigger (TAT) or some other suitable trigger for initiating a query to SCP 33. Also as know in the art, signaling network 34 may be the well-known common channel signaling system number 7 (CC-SS7 or SS7) or some other signaling network. In response to the query, SCP 33 consults database 35 to locate the caller's calling name information.

SCP 33 provides the calling name information to SSP 31, which in turn provides the information to caller-id device 23. As known in the art, the calling name and number could be marked as private by the caller in which case the caller-id information provided to device 23 is "unavailable". Further, as known in the art, the calling name may be indeterminate, in which case device 23 displays "unknown" for the calling name but may display the calling number. SCP 33 provides the information including, at least, the called party number and the calling number (if available) to server 40 to store in database 45 for access by subscriber 20.

Server 40 may combine information received from SCP 33 and the user profile information received from user 10 with other information to enhance the caller-id service. For example, server 40 may provide additional geographical information such as the postal zip code of the caller or the caller's county, state, or country. Such information may be compiled and stored in database 45 and cross-referenced with the calling number and calling name information as needed. Similarly, server 40 may rearrange the information according to the subscriber's display preferences. For example, server 40 may provide a sort option to display information according to the date/time of the calls, by calling party number, by calling name, by geographic location, by area code, or other criteria.

Server 40 may also provide detailed reports to subscriber 30 and present information in many formats. For example, a report may be provided to summarize the prior month's calls. Another report may provide a breakdown of calls, for example, by time of day, by calling number, or other criteria.

In another embodiment of the present invention, SCP 33 may provide follow-up information regarding incoming calls. For example, after a call has ended, SCP 33 may send a message to server 40 indicating the length of the call. SCP 33 may also provide detailed information such as the circuit and trunk id for the call. In an exemplary configuration of this embodiment, SCP 33 may respond to SSP 31's query in the usual manner and also issues a Monitor-for-Change query, or other suitable instruction, to SSP 31. In response to the instruction SSP 31 monitors subscriber line 22 for a change in status (such as the line becoming idle after a call has ended). When SSP 31 detects the change in status it reports the event to SCP 33. SCP 33 may use this information, in conjunction with the original query to compute a call duration. The call duration may then be included in an information message sent from SCP 33 to server 40.

Figure 2:
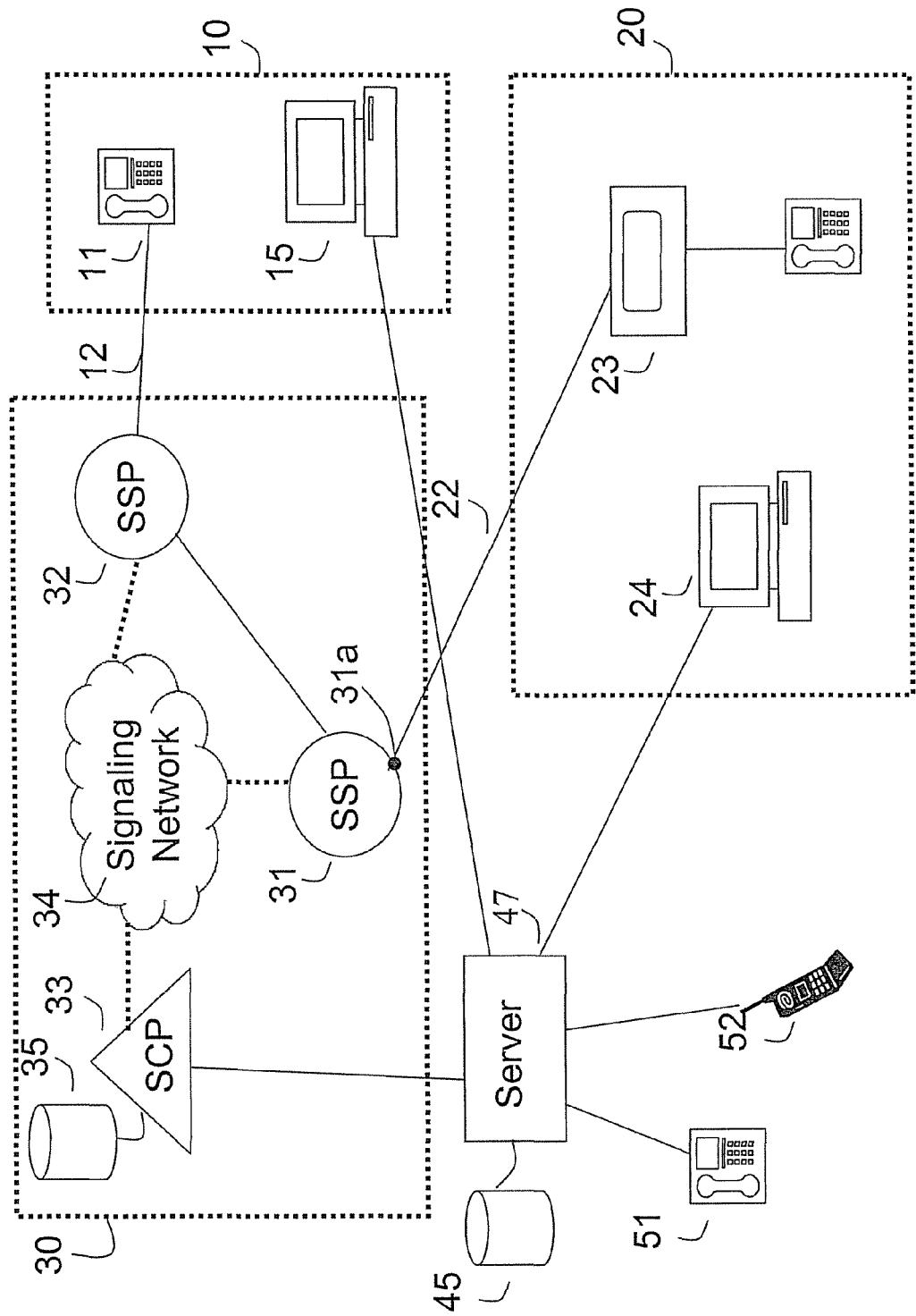
FIG. 2 is a schematic diagram showing the operation of another exemplary embodiment of the present invention.

In an alternative embodiment, the server may include test-to-speech functionality allowing the subscriber to retrieve suitable portions of the caller information using any telephone device. FIG. 2 is a schematic diagram showing an exemplary configuration for this embodiment. Like numbered elements in FIG. 2 perform substantially the same functions are described above. Server 47 allows subscriber 20 to check for incoming calls placed to his or her telephone line 22. Using any telephone, such as, for example, telephone 51 or mobile telephone 52, subscriber 20 can call server 47 to hear a summary of inbound calls placed to wireline 22. This embodiment may incorporate an interactive voice response system providing a menu of options available to subscribers. Further, as shown in FIG. 2, subscriber 20 may still access the full-enhanced caller information using, for example, computer 24.

Figure 3:
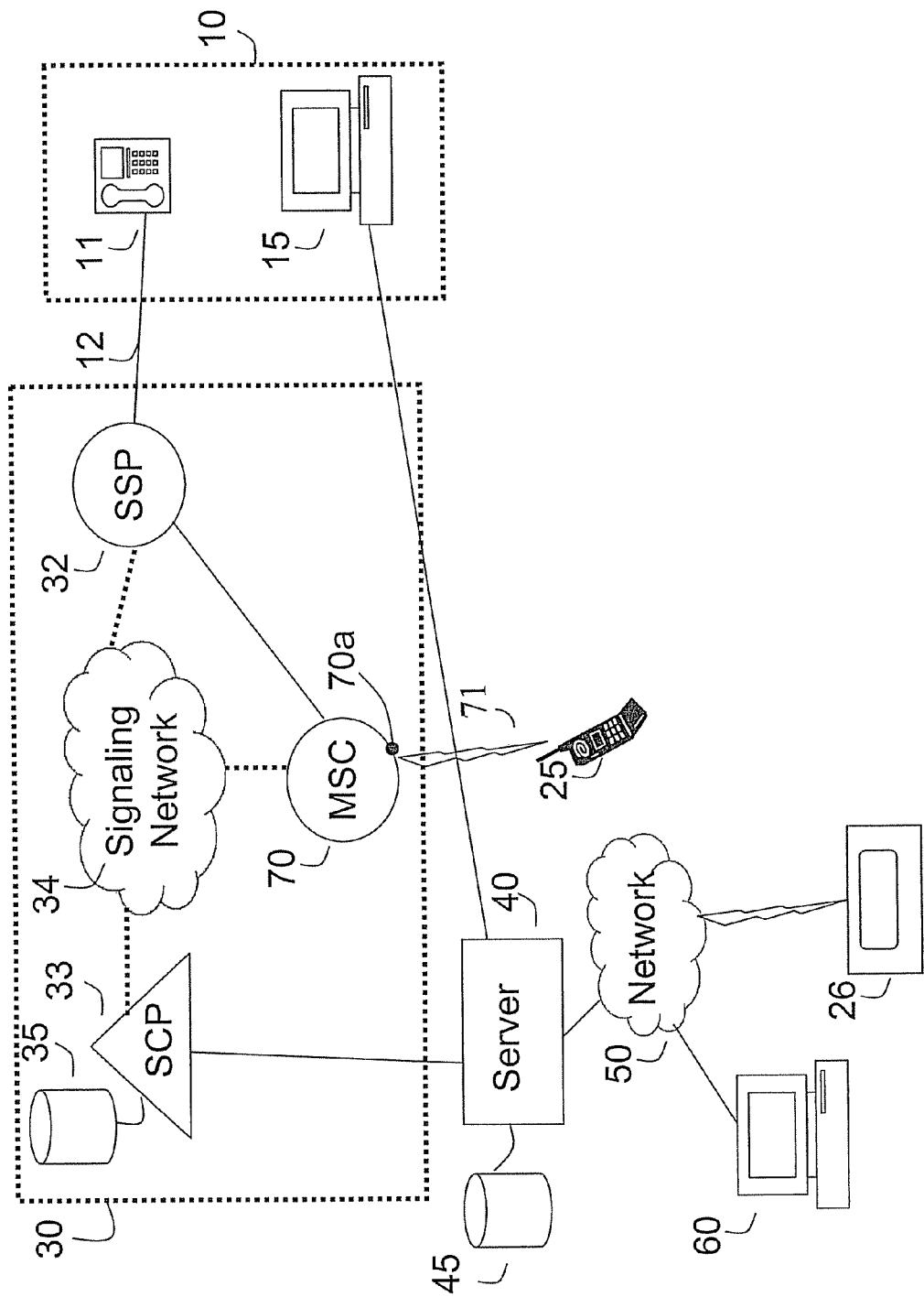
FIG. 3 is a schematic diagram showing the operation of another exemplary embodiment of the present invention.

FIG. 3 is a schematic diagram showing another exemplary embodiment of the present invention. This embodiment includes many of the same elements as shown in FIG. 1 and 2. However, instead of the subscriber having a separate caller-id device and a wireline, in this embodiment, the subscriber has a wireless telephone 25 with integrated caller-id services. As shown in FIG. 3, when caller 10 places a call to wireless telephone 25, it eventually reaches mobile switching center (MSC) 70 for delivery to wireless telephone 25 via wireless connection 71. Just as with wireline systems, trigger 70a on the subscriber's "line" may be provisioned at MSC 70. MSC 70 issues a query to SCP 33 via signaling network 34 in response to the trigger. Accordingly, when the incoming call reaches MSC 70, it sends a query to SCP 33. As described above, SCP 33 responds to the query as it normally would, but also sends caller-id information (for example, called party number, calling name and calling number) to server 40. The information sent by SCP 33 to server 40 in this embodiment may include any of the information already described above.

Figure 4:
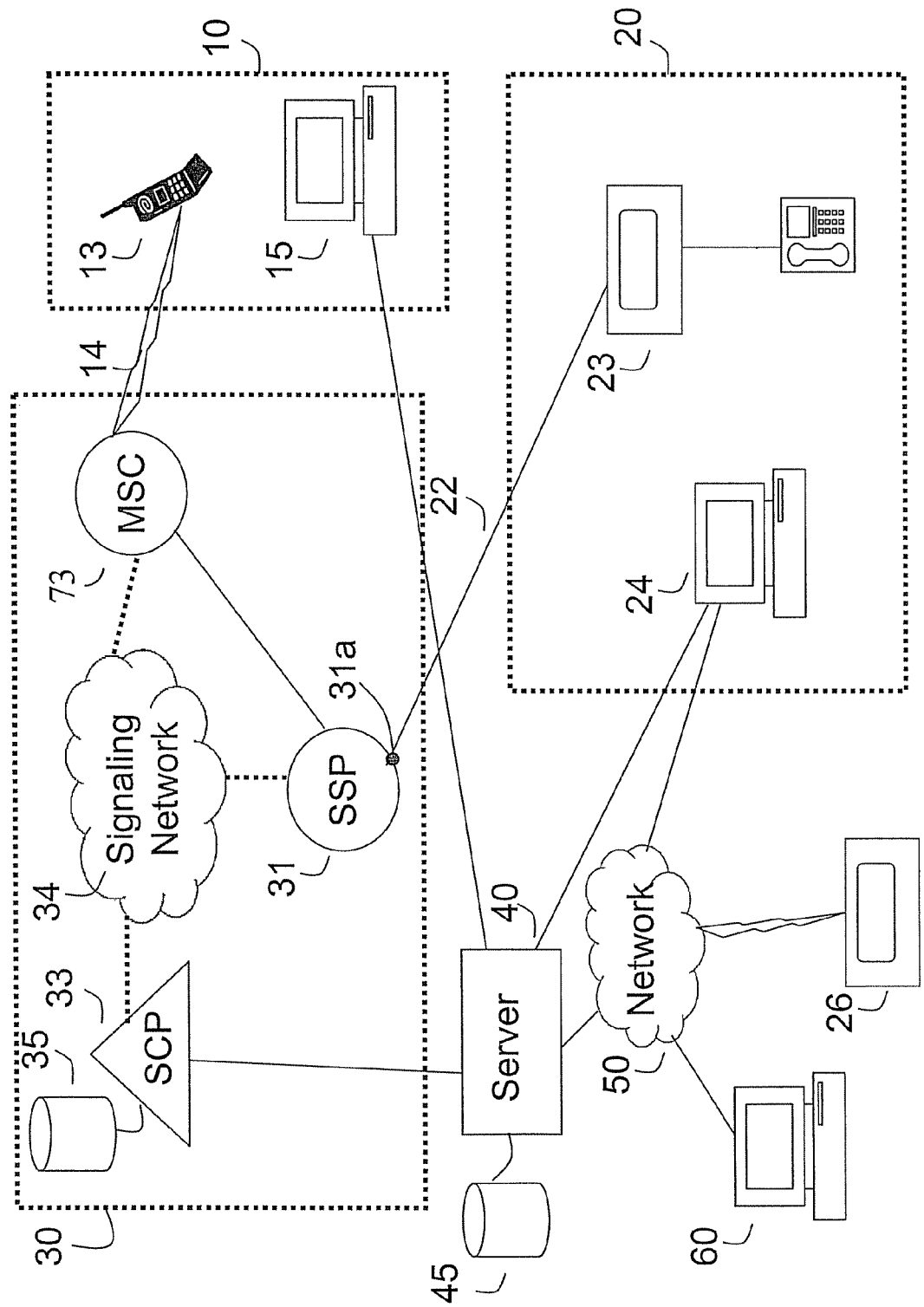
FIG. 4 is a schematic diagram showing the operation of another exemplary embodiment of the present invention.

FIG. 4 is a schematic diagram showing another embodiment of the present invention. In this embodiment, the caller uses wireless telephone 13 and wireless connection 14 to call subscriber 20 via MSC 73. In this embodiment, MSC 73 is programmed to include the caller's geographic location information in a field of the initial address message (IAM) used to setup the call with SSP 31. This call encounters trigger 31a on subscriber 20's line 22 causing SSP 31 to issue a query to SCP 33. SSP 31 includes the location information in the query message for processing by SCP 33. Such information could be based on the cell-site from which the caller is calling or if emergency 911 services are implemented, a more precise location could be provided. SCP 33 includes the caller-id information (i.e., calling number, calling name, and the physical location of the caller) in the message sent to server 40.

In addition to providing detailed multi-media information to subscribers and near real-time views of incoming call information, the present invention provides a permanent or long-term log of all incoming call information in a database stored by the service provider. As described above, a subscriber may download this log onto a computer for historical or other uses. For example, a subscriber could use to the information to bill callers for the time spent on the telephone. Additionally, the caller information and historical log information could be integrated with other applications on the subscriber's computer, for example, address books, time-keeping logs, and the like. The information captured may be used in conjunction with existing web information services to create complete entries in address books such as those associated with email applications. Moreover, the information may be used to perform various business analyses such as geographic and demographic analysis of callers.

Servers used in embodiments of the present invention may include, e.g., web servers, email servers, file transfer protocol servers (FTP), and the like. Users and subscribers may use any suitable client or server application to access and receive data from the server.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention

What is claimed is:

1. A method for providing enhanced caller information to a subscriber, the method comprising:

receiving, on a server, caller profile information from a caller, the caller profile information including a caller number and enhanced caller information that is pre-entered by the caller;

receiving a call from the caller to a subscriber;

sending a message to the server, the message including the caller number and a subscriber number for the call;

matching, at the server, the caller number to the caller profile information;

selecting, at the server, based on the subscriber number, enhanced profile information from the caller profile information associated with the caller number; and providing the enhanced caller information from the server to the subscriber upon request by the subscriber, said enhanced caller information being based on the caller profile information;

wherein the subscriber number is associated with an access list in the caller profile information, and wherein providing the enhanced caller information to the subscriber further comprises:

determining whether the subscriber number matches a called party directory number of the caller profile information; and if the subscriber number matches the called party directory number, then providing some but not all of the enhanced caller information based on the called directory number being associated with a level the access list.

2. The method of claim 1, wherein the caller profile information further comprises a multi-media document.

3. The method of claim 1, wherein the caller profile information further comprises a graphical file.

4. The method of claim 1, wherein the caller profile information further comprises a caller address.

5. The method of claim 4, wherein the caller profile information further comprises a map showing the caller address.

6. The method of claim 1, wherein the caller profile information further comprises a link to a web site.

7. The method of claim 1, wherein the message further comprises a caller location.

8. The method of claim 7, wherein the caller location represents a location of a wireless caller.

9. The method of claim 7, wherein the enhanced caller information comprises a map showing the caller location.

10. The method of claim 1, further comprising receiving a username and a password before providing the enhanced caller information to the subscriber.

11. A system for providing enhanced caller information, the system comprising:
 means for receiving a call from a caller to a subscriber number associated with a subscriber;
 means for receiving caller profile information associated with the caller, wherein the caller profile information includes a caller number and enhanced caller information that is pre-entered by the caller;
 means for providing the caller profile information to a server;
 wherein when the call to the subscriber is received, a message is sent to the server, the message including a caller number and the subscriber number, and
 wherein in response to a request by the subscriber, the server selects the enhanced caller information based on the caller number and the subscriber number and provides the enhanced caller information to the subscriber, the enhanced caller information is based on the caller profile information;
 wherein the subscriber number is associated with an access list in the caller profile information, and
 wherein providing the enhanced caller information to the subscriber further comprises:
  determining whether the subscriber number matches a called party directory number of the caller profile information; and
  if the subscriber number matches the called party directory number, then providing some but not all of the enhanced caller information based on the called director number being, associated with a level the access list.

12. The system of claim 11, wherein the server further provides a calling name, a calling date, a calling time and a call stop time to the subscriber.

13. The system of claim 11, wherein the server further provides a caller address to the subscriber.

14. The system of claim 13, wherein the server further provides a map showing the caller address to the subscriber.

15. The system of claim 11, wherein the server further provides a caller location to the subscriber.

16. The system of claim 15, wherein the server further provides a map showing the caller location to the subscriber.

17. A non-transitory computer readable medium including computer program instructions for providing enhanced caller information to a subscriber, when executed by a processor the instructions causing the processor to perform:
 receiving, on a server, caller profile information from a caller, the caller profile information including a caller number and enhanced caller information that is pre-entered by the caller;
 receiving a call from the caller to a subscriber;
 sending a message to the server, the message including the caller number and a subscriber number for the call;
 matching, at the server, the caller number to the caller profile information;
 selecting, at the server, based on the subscriber number, enhanced profile information from the caller profile information associated with the caller number; and
 providing the enhanced caller information from the server to the subscriber upon request by the subscriber, said enhanced caller information being based on the caller profile information;
 wherein the subscriber number is associated with an access list in the caller profile information, and
 wherein providing the enhanced caller information to the subscriber further comprises:
  determining whether the subscriber number matches a called party directory number of the caller profile information; and
  if the subscriber number matches the called party directory number, then providing some but not all of the enhanced caller information based on the called directory number being associated with a level the access list.

* * * * *